Figure 1:
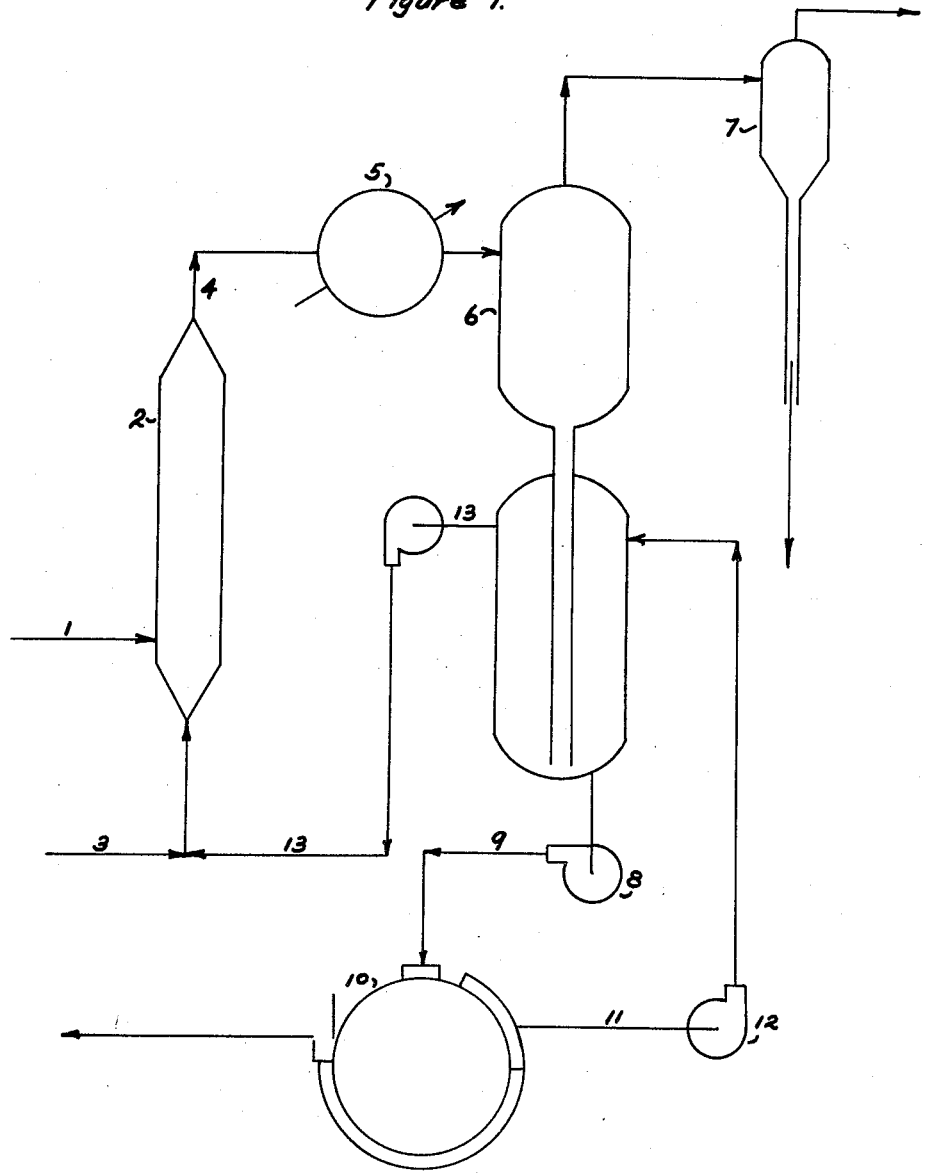

May 10, 1955     T. D. McMINN, JR     2,708,151
PRODUCTION OF ALKALI METAL CYANIDES
Filed June 18, 1953     2 Sheets-Sheet 1

INVENTOR
Talmage D. McMinn Jr.
BY
ATTORNEY

May 10, 1955     T. D. McMINN, JR     2,708,151
PRODUCTION OF ALKALI METAL CYANIDES
Filed June 18, 1953          2 Sheets—Sheet 2
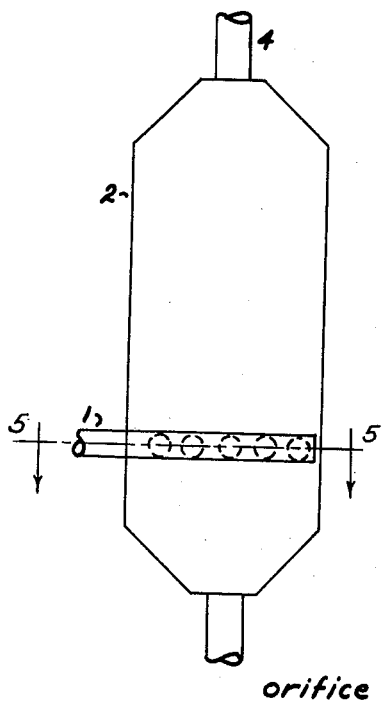
Figure 2.
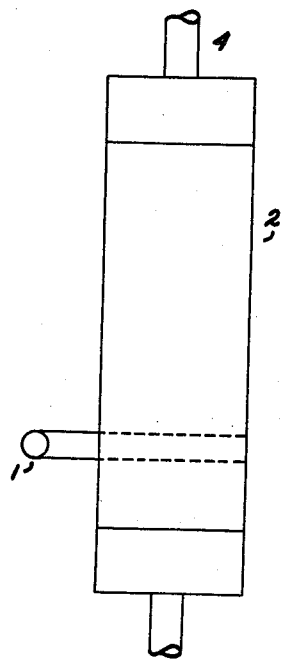
Figure 3.
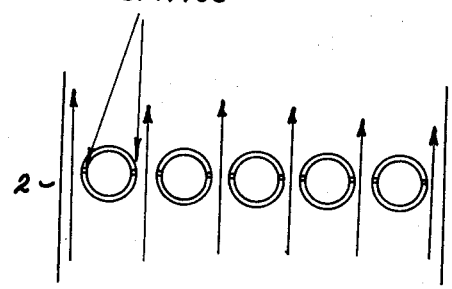
Figure 4.
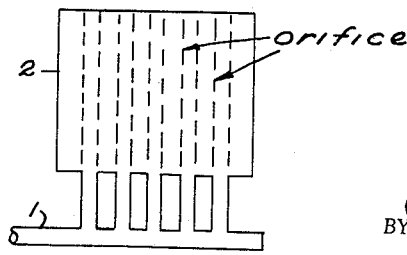
Figure 5.    NaOH
INVENTOR
*Talmage D. McMinn Jr.*
BY
ATTORNEY

2,708,151
PRODUCTION OF ALKALI METAL CYANIDES

Talmage D. McMinn, Jr., Texas City, Tex., assignor to Monsanto Chemical Company, St. Louis, Mo., a corporation of Delaware Application June 18, 1953, Serial No. 362,514

5 Claims. (Cl. 23—79)

This invention relates to the production of alkali metal cyanides and more particularly to the production of alkali metal cyanides in a substantially pure state by the direct neutralization of an alkali metal hydroxide with hydrogen cyanide gas.

The majority of the prior art processes for producing alkali metal cyanides via neutralization of alkali metal hydroxides with hydrogen cyanide gas are batch operations which are characterized by certain disadvantages. The product of the known processes, even after subjection to a relatively expensive purification treatment, is ordinarily in a more or less impure state. Polymerization of hydrogen cyanide during neutralization and partial decomposition of the cyanide during evaporation result in discoloration and degradation in quality of the final product. In addition, the loss of cyanide values is significant. One expedient commonly employed to avoid the mentioned difficulties is the production of a reaction solution containing a substantial amount of an alkali metal hydroxide but where this practice is resorted to the purity of the alkali metal cyanide product does not generally exceed 90%. Another suggested expedient involves added process steps and the intervention of a foreign reagent, namely alcohol, to remove impurities but this operation results in unnecessarily high costs.

It has now been discovered that it is possible to obtain alkali metal cyanides in a state of high purity by means of a continuous process of neutralization in a special type of apparatus which provides for complete and rapid reaction of hydrogen cyanide, thus reducing polymerization to a minimum and consequently eliminating attendant discoloration and degradation of the product.

It is the object of the invention, therefore, to provide a continuous process for the production of a substantially pure alkali metal cyanide by the neutralization of an alkali metal hydroxide with hydrogen cyanide which is simple, economical, and practical.

Other objects and advantages of the invention will become apparent from the following description of a preferred embodiment read in conjunction with the attached drawings.

Figure 1 is a diagrammatic flowsheet of the process of the invention. Substantially pure hydrogen cyanide gas is introduced via line 1 into the gas manifold of the reactor 2 at a rate of approximately 275 lb./hr. A 1:1 aqueous solution of sodium hydroxide is fed to the reactor via line 3 at a rate of 816 lb./hr. The reactor 2 is a gas-liquid contactor in which there is a grid of parallel pipes spaced closely, with orifices near the plane of the axes of the pipes. A front view of the reactor is shown in the line drawing of Figure 2, while the side view of the reactor is presented in Figure 3. Figure 5 is a horizontal sectional view of the reactor taken on line 5—5 of Figure 2. When the hydrogen cyanide gas is introduced into the gas inlet manifold 1 of Figure 2, it flows through the orifices, forming bubbles of gas in the reaction chamber of the reactor. The velocity of the entering sodium hydroxide solution "shears" off the entering bubbles of gas as they are formed and before they have opportunity to reach an equilibrium size. The direction of flow of the sodium hydroxide-saturated sodium cyanide stream and its "shearing" action is sketched in Figure 4. A very fine dispersion of gas-in-liquid is thus provided, since a very large gas reaction surface is presented per volume of gas, which promotes immediate and rapid reaction and prevents polymerization of hydrogen cyanide.

Reaction temperature is maintained at approximately 40° C.

The reaction solution, which is essentially saturated with sodium cyanide, is withdrawn via line 4, passed through heat exchanger 5, and fed into a classifying crystallizer or evaporator 6. The evaporator is operated under a vacuum of approximately 27 mm. Hg absolute, which is preferably maintained by means of the barometric condenser 7, which operates under a load of about 591 lb./hr. or roughly 591,000 B. t. u./hr., in conjunction with vacuum jets. A crystal magma of sodium cyanide, containing approximately 10% of solid material, precipitates out in the bottom of the crystallizer or evaporator and is pumped via pump 8 through line 9 to a rotary filter 10 where the solid is dried under vacuum by means of hot air. The solution from the filter is recycled to the crystallizer via line 11 and pump 12.

An essentially saturated solution of sodium cyanide containing 5% free sodium hydroxide from the crystallizer 6 is recycled at a rate of 5000 lb./hr. via line 13 to the reactor, entering with the fresh sodium hydroxide feed. This recycle stream of sodium cyanide provides for flexibility of operation in the event of changing feed rates and the free sodium hydroxide present materially reduces acid-base hydrolysis, which tends to break down the sodium cyanide product and cause significant loss of sodium cyanide values.

Variations in reactants and in operating conditions from those given in the example may be made without departing from the scope of the invention.

Any of the alkali metal hydroxides such as potassium hydroxide, lithium hydroxide, etc., may be employed with equal success in the process instead of sodium hydroxide to yield the corresponding potassium cyanide, lithium cyanide, etc.

The neutralization reaction is only slightly exothermic and may be conducted in the temperature range of 20 to 55° C., but is preferably carried out at about 40° C. The lower temperature limit is controlled mainly by the solubility of the alkali metal hydroxide in the alkali metal cyanide recycle stream.

Stoichiometric quantities of the reactants are fed to the reactor. The concentration of the alkali metal hydroxide solution is not restricted to that given in the example, but may vary over a wide range, limited only by practical considerations with regard to volume of flow, reactor capacity, etc.

The temperature at which evaporation takes place may be varied from 25 to 75° C. For optimum efficiency, the temperature is maintained within that range where an economic balance is effected between the cost of maintaining the necessary vacuum by means of vacuum jets and the loss of cyanide values by hydrolysis. This preferred range falls between 25° and 55° C.

Any of the alkali metal cyanide hydrates produced by the process of the invention may be readily converted to the anhydrous salt by dehydration accomplished by heating in vacuo. In the case of sodium cyanide, it is possible to produce the anhydrous cyanide directly by evaporating reaction solutions of certain specified compositions at particular temperatures, as described in a copending application, Serial Number 357,067, filed May 25, 1953 and assigned to the same assignee.

What is claimed is:

1. A process for the production of an alkali metal cyanide by the neutralization of an alkali metal hydroxide with hydrogen cyanide gas which comprises introducing hydrogen cyanide gas into the gas inlet manifold of a reactor comprising a reaction chamber in which there is disposed a grid of closely-spaced parallel pipes with orifices near the horizontal plane of axes of the pipes said pipe grid members being connected to said inlet manifold in such manner that gas introduced into said manifold flows through said pipe grid members and is ejected through said orifices, introducing an aqueous solution of an alkali metal hydroxide into the bottom of said reaction chamber in such manner that the entering solution shears off the bubbles of gas as they emerge from the orifices, withdrawing the reaction solution from the top of said reactor, evaporating said solution in a crystallizer where a crystal magma of alkali metal cyanide is precipitated, recycling an essentially saturated solution of the alkali metal cyanide from the crystallizer to the reactor, withdrawing the crystal magma from the crystallizer and passing it to a rotary filter where the solid is dried, recycling the liquid from said filter to said crystallizer, and recovering substantially pure crystals of alkali metal cyanide from said filter.

2. The process of claim 1 in which the reaction temperature is maintained within the range from 20 to 55° C.

3. The process of claim 1 in which the reaction solution is evaporated at a temperature from 25 to 55° C.

4. A process for the production of sodium cyanide by the neutralization of sodium hydroxide with hydrogen cyanide gas which comprises introducing hydrogen cyanide gas into the gas inlet manifold of a reactor comprising a reaction chamber in which there is disposed a grid of closely-spaced parallel pipes with orifices near the horizontal plane of axes of the pipes, said pipe grid members being connected to said inlet manifold in such manner that gas introduced into said manifold flows through said pipe grid members and is ejected through said orifices, introducing an aqueous solution of sodium hydroxide into the bottom of said reaction chamber in such manner that the entering solution shears off the bubbles of gas as they emerge from the orifices, withdrawing the reaction solution from the top of said reactor, evaporating said solution in a crystallizer where a crystal magma of sodium cyanide is precipitated, recycling an essentially saturated solution of sodium cyanide from the crystallizer to the reactor, withdrawing the crystal magma from the crystallizer and passing it to a rotary filter where the solid is dried, recycling the liquid from said filter to said crystallizer, and recovering substantially pure crystals of sodium cyanide from said filter.

5. A process for the production of sodium cyanide by the neutralization of sodium hydroxide with hydrogen cyanide gas which comprises introducing hydrogen cyanide gas into the gas inlet manifold of a reactor comprising a reaction chamber in which there is disposed a grid of closely-spaced parallel pipes with orifices near the horizontal plane of axes of the pipes said pipe grid members being connected to said inlet manifold in such manner that gas introduced into said manifold flows through said pipe grid members and is ejected through said orifices, introducing, at a temperature in the range of from about 20° C. to about 55° C., an aqueous solution of sodium hydroxide into the bottom of said reaction chamber in such manner that the entering solution shears off the bubbles of gas as they emerge from the orifices, withdrawing the reaction solution from the top of said reactor, evaporating said solution at a temperature in the range of from about 25° C. to about 55° C., in a crystallizer where a crystal magma of sodium cyanide is precipitated, recycling an essentially saturated solution of sodium cyanide from the crystallizer to the reactor, withdrawing the crystal magma from the crystallizer and passing it to a rotary filter where the solid is dried, recycling the liquid from said filter to said crystallizer, and recovering substantially pure crystals of sodium cyanide from said filter.

References Cited in the file of this patent
UNITED STATES PATENTS 2,365,417    Kusman _____ Dec. 19, 1944